US011343562B1

(12) United States Patent
White et al.

(10) Patent No.: US 11,343,562 B1
(45) Date of Patent: May 24, 2022

(54) DIGITAL RECEIVER INTEGRATED LOCAL CHANNEL INSERTION

(71) Applicant: Cox Communications, Inc., Atlanta, GA (US)

(72) Inventors: John Jacob White, Marietta, GA (US); Kinney Chapman Bacon, Lawrenceville, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 17/235,305

(22) Filed: Apr. 20, 2021

(51) Int. Cl.
  *H04N 21/436* (2011.01)
  *H04N 7/10* (2006.01)
  *H04N 21/4363* (2011.01)
  *H04N 5/765* (2006.01)

(52) U.S. Cl.
  CPC ....... *H04N 21/43615* (2013.01); *H04N 5/765* (2013.01); *H04N 7/10* (2013.01); *H04N 21/43635* (2013.01)

(58) Field of Classification Search
  CPC ....... H04N 21/43615; H04N 21/43635; H04N 7/10; H04N 5/765
  See application file for complete search history.

(56) References Cited

U.S. PATENT DOCUMENTS

| | | | | |
|---|---|---|---|---|
| 2002/0065950 A1* | 5/2002 | Katz | ................. | H04N 21/2543 719/318 |
| 2004/0172658 A1* | 9/2004 | Rakib | ............. | G08B 13/19658 725/120 |
| 2007/0177610 A1* | 8/2007 | Zuberi | ................ | H04L 47/2416 370/395.42 |
| 2007/0180485 A1* | 8/2007 | Dua | ....................... | H04L 61/106 725/114 |
| 2007/0250900 A1* | 10/2007 | Marcuvitz | .......... | H04N 7/17309 725/141 |
| 2008/0052426 A1* | 2/2008 | Montag | .................... | H04N 7/15 710/62 |
| 2009/0074051 A1* | 3/2009 | Manapragada | ....... | H04L 65/605 375/240 |
| 2011/0162013 A1* | 6/2011 | Bagasra | ........... | H04N 21/44227 725/74 |
| 2011/0277001 A1* | 11/2011 | Kaluskar | ............. | H04L 12/2825 725/80 |

(Continued)

*Primary Examiner* — Fernando Alcon
(74) *Attorney, Agent, or Firm* — Merchant & Gould P.C.

(57) ABSTRACT

Digital receiver integrated local channel insertion is described. A network-connected digital receiver may be configured to bridge its network connection to extend IP connectivity via a single cable to a compatible peripheral device. In this way, the peripheral device may be connected to the local network in a controlled and automated way and, when being leveraged by an application operating on the digital receiver, the application may be granted the necessary traffic priority settings for application performance. For example, a USB, HDMI, or Ethernet connection with a peripheral device can be used by the digital receiver to provide an end-to-end managed peripheral device solution that eliminates user-intervention associated with networking, set-up, and management of the peripheral device. Various aspects of the present disclosure may be facility by a peripheral device connectivity engine that may be natively programmed into the digital receiver software stack, allowing for an intuitive user experience.

20 Claims, 6 Drawing Sheets

(56) References Cited

U.S. PATENT DOCUMENTS

| | | | | |
|---|---|---|---|---|
| 2011/0302313 A1* | 12/2011 | Diab | ............... | H04L 12/66 |
| | | | | 709/227 |
| 2012/0166642 A1* | 6/2012 | Saint Clair | ......... | H04L 12/2818 |
| | | | | 709/225 |
| 2012/0191894 A1* | 7/2012 | Sasaki | ............ | G06F 13/387 |
| | | | | 710/313 |
| 2012/0300016 A1* | 11/2012 | Li | ............ | H04N 21/64322 |
| | | | | 348/14.09 |
| 2013/0080662 A1* | 3/2013 | Bourque | ......... | H04N 21/43635 |
| | | | | 710/10 |
| 2016/0112469 A1* | 4/2016 | Liu | ............ | H04N 7/152 |
| | | | | 348/14.03 |
| 2016/0360256 A1* | 12/2016 | Van Os | ............ | A63F 13/00 |
| 2020/0236152 A1* | 7/2020 | Bradley | ............ | H04L 67/303 |

* cited by examiner

DIGITAL RECEIVER INTEGRATED LOCAL CHANNEL INSERTION

BACKGROUND

Some application services, such as consumer-grade videoconferencing, may be typically restricted to specialty single-user devices, such as mobile phones, tablets, laptops, desktop computers, video-calling touch screen displays, or other devices including or connected to a camera. Set-up and configuration of such devices and associated peripheral devices is oftentimes confusing and difficult. In some cases, an application service, such as a videoconference session between participants, may be restricted to participants using the same type of device and/or application for the session. Furthermore, once set up, users are commonly confined to awkward or restrictive environments that limit the flexibility and comfort of use during a session. These challenges may be uniquely highlighted during situations where a greater number of average or novice users of technology may be in need of advanced connectivity solutions, such as during a pandemic or other type of emergency situation where there may be a rapidly shifting paradigm of social distancing and work-from-home situations.

SUMMARY

Aspects of the present disclosure disclose a system, method, and computer readable storage media, but are not so limited, to provide digital receiver integrated local channel insertion. One example implementation of digital receiver integrated local channel insertion includes using a digital receiver to automatically set up and manage a peripheral device connected to the digital receiver and to request priority on a local network for application traffic that leverages data provided by the peripheral device. A network-connected digital receiver may be configured to bridge its network connection to extend Internet Protocol (IP) connectivity via a single cable to a compatible peripheral device. In this way, the peripheral device may be connected to the local network in a controlled and automated way and, when the peripheral device is being leveraged by an application operating on the digital receiver, the application may be granted the necessary traffic priority settings for application performance.

In one aspect, a system for providing digital receiver integrated local channel insertion includes a computing system that includes at least one processor; a memory coupled to the at least one processor, the memory including instructions that when executed by the at least one processor operate to: monitor a connection interface for a connected peripheral device; and in response to receiving an indication of a connected peripheral device: perform a discovery process to obtain peripheral device information; establish a communications link with the peripheral device based on the peripheral device information received as part of the discovery process; determine one or more applications configured to leverage data of a data type provided by the peripheral device; enable the one or more applications to be selectively opened by a user; and in response to receiving an indication of a selection to open one of the one or more applications: allow the selected application to communicate with the peripheral device for receiving data provided by the peripheral device; and instruct a network gateway device to prioritize the selected application's traffic on a local communications network provided by the network gateway device.

In another aspect, a method of providing digital receiver integrated local channel insertion comprises: monitoring a connection interface for a connected peripheral device; and in response to receiving an indication of a connected peripheral device: performing a discovery process to obtain peripheral device information; establishing a communications link with the peripheral device based on the peripheral device information received as part of the discovery process; determining one or more applications configured to leverage data of a data type provided by the peripheral device; enabling the one or more applications to be selectively opened by a user; and in response to receiving an indication of a selection to open one of the one or more applications: allowing the selected application to communicate with the peripheral device for receiving data provided by the peripheral device; and instructing a network gateway device to prioritize the selected application's traffic on a local communications network provided by the network gateway device.

In another aspect, a digital receiver configured to provide digital receiver integrated local channel insertion includes a connection interface configured to receive one of: a Universal Serial Bus (USB) cable connection; an HDMI (High-Definition Multimedia Interface) cable connection; or an Ethernet cable connection; a network interface via which the digital receiver is communicatively connected to a network gateway device, the network gateway device providing a local communications network connected to an IP network; at least one processor; a memory coupled to the at least one processor, the memory including instructions that when executed by the at least one processor operate to: monitor the connection interface for a connected peripheral device; and in response to receiving an indication of a connected peripheral device: perform a discovery process to obtain peripheral device information; establish a USB, HDMI, or Ethernet communications link with the peripheral device based on the peripheral device information received as part of the discovery process; determine one or more applications configured to leverage data of a data type provided by the peripheral device; enable the one or more applications to be selectively opened by a user; and in response to receiving an indication of a selection to open one of the one or more applications: allow the selected application to communicate with the peripheral device for receiving data provided by the peripheral device; and instruct the network gateway device to prioritize the selected application's traffic on the local communications network.

The details of one or more aspects are set forth in the accompanying drawings and description below. Other features and advantages will be apparent from a reading of the following detailed description and a review of the associated drawings. It is to be understood that the following detailed description is not intended to be restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views.

DETAILED DESCRIPTION

Aspects of the present disclosure provide a system, method, and computer-readable storage media for providing digital receiver integrated local channel insertion according to an embodiment. For example, digital receiver integrated local channel insertion may include automated peripheral device setup and management and traffic prioritization for an application leveraging the peripheral device. According to an aspect, a network-connected digital receiver may be configured to bridge its network connection to extend Internet Protocol (IP) connectivity via a single cable to a compatible peripheral device. In this way, the peripheral device may be connected to the local network in a controlled and automated way and, when being leveraged by an application operating on the digital receiver, the application may be granted the necessary traffic priority settings for application performance. For example, a Universal Serial Bus (USB) connection, a High-Definition Multimedia Interface (HDMI) connection, or an Ethernet connection between the digital receiver and a peripheral device can be used by the digital receiver to provide an end-to-end managed peripheral device solution that reduces or eliminates user-intervention associated with networking, set-up, and management of the peripheral device. Various aspects of the present disclosure may be facilitated by a peripheral device connectivity engine that may be natively programmed into the digital receiver software stack, allowing for an intuitive user experience.

Aspects of digital receiver integrated local channel insertion enable the benefit of various technical effects that may include, but are not limited to, eliminating user-facilitated peripheral device set-up and management, improved usability of applications, such as web conferencing applications, by eliminating a need for specialty single-use devices, and improved application performance by automatically providing traffic prioritization. Moreover, various aspects may be enabled by making the solution available natively through a digital receiver that is commonly connected to larger display in a comfortable setting in a viewing environment. Additionally, aspects may simplify the process of increasing videoconferencing end-points without requiring costs to the consumer associated with additional/dedicated computing devices.

Figure 1:
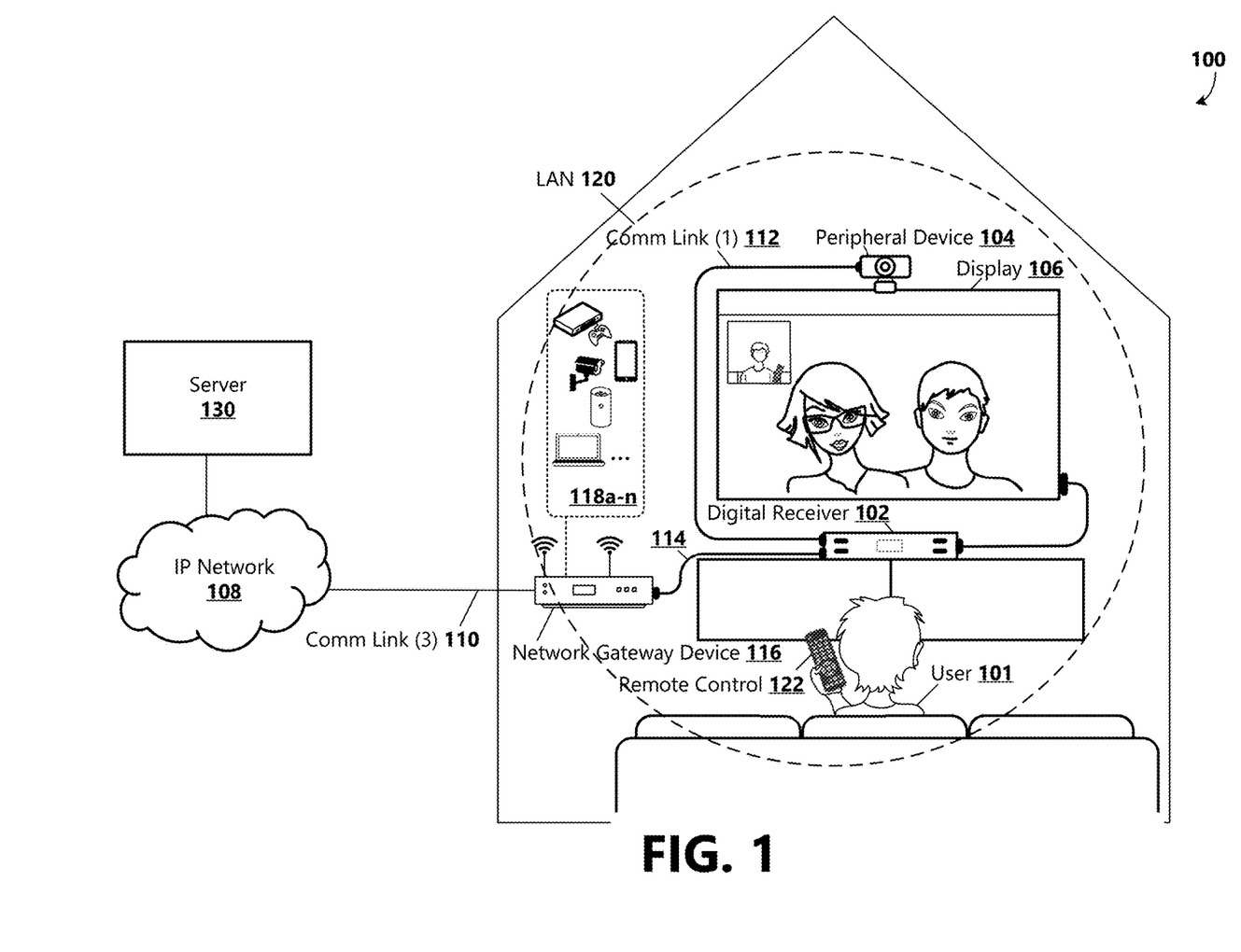
FIG. 1 is a block diagram of an example operating environment in which aspects of the present disclosure can be implemented for providing digital receiver integrated local channel insertion according to an embodiment.

FIG. 1 is a block diagram of an example operating environment 100 in which digital receiver integrated local channel insertion can be performed in accordance with one or more aspects of the present disclosure. In FIG. 1, a peripheral device 104, illustrated as a web camera, is connected to a digital receiver 102 (which may also be referred to herein as a set top box (STB)) via a first communications link 112. The first communications link 112 may be a communications channel that supports digital communications of data between the peripheral device 104 and the digital receiver 102. Non-limiting examples of the first communications link 112 include a USB connection, an HDMI connection, and an Ethernet connection. Other types of communications links are possible and are within the scope of the present disclosure.

According to one implementation example, the peripheral device 104 is a web camera operative or configured to capture images via an image sensor, convert the images into a digital format that can be leveraged by an application executing on the digital receiver 102, and transmit the image data in real time (or near-real time) to the digital receiver 102 via the first communications link 112. The peripheral device 104, embodied as a web camera, may be further operative or configured to capture audio via an audio sensor (e.g., a microphone), convert the audio into a digital format, and transmit the audio data in real time (or near-real time) to the digital receiver 102 via the first communications link 112. According to one example, the application may be a videoconferencing application operative or configured to enable a user 101 to conduct or attend a web videoconference session with other conference participants over an IP network 108 or a combination of IP networks 108. In other implementation examples, other types of applications may execute on the digital receiver 102 that may be operative to support or leverage the data format transmitted by the peripheral device 104.

According to an aspect, the digital receiver 102 is communicatively connected to a network gateway device 116 via a second communications link 114 (e.g., an Ethernet connection, a coaxial cable connection, or a WI-FI connection). The network gateway device 116 may provide a local communications network (e.g., a Local Area Network (LAN), a Wireless Local Area Network (WLAN), a Personal Area Network, or other type of subscriber premises network), herein referred to as a LAN 120, that the digital receiver 102 and a variety of devices 118a-n (generally, 118) may connect to via wired and/or wireless connections. In some examples, functionality of the network gateway device 116 may be distributed amongst a plurality of devices (e.g., a router device and a modem device). Non-limiting examples of devices 118 include servers, workstations, set top boxes, desktop computers, laptop computers, tablets, mobile phones, smart devices, gaming devices, IoT devices, databases, etc. Further details of the computing devices and variations thereof can be found in FIGS. 5 and 6.

The network gateway device 116 may be further communicatively connected to an Internet Service Provider (ISP) network (IP network 108) via a third communications link 110 (e.g., coaxial cable connection, fiber optic connection, wireless connection, satellite connection, Digital Subscriber Line (DSL) connection), which may provide broadband Internet service to the subscriber premises via one or a combination of broadband connections. For example, the network gateway device 116 may be operative or configured to connect the digital receiver 102 and other devices 118 that are communicatively connected to it to the IP network 108, which may allow the digital receiver 102 and other devices 118 to communicate with a server 130 connected to the IP network 108. One example server 130 may be a web videoconferencing server operative or configured to provide videoconferencing services for establishing videoconferencing sessions between clients.

Further details of the peripheral device 104 and the digital receiver 102 in accordance with one or more aspects of the present disclosure are described with reference to FIG. 2. In an example implementation, the digital receiver 102 is a multipurpose computing device that includes at least one processor and a memory coupled to the at least one processor, the memory including instructions that when executed by the at least one processor generally operate to receive and decode digital television signals, and to transform the digital television signals into a format suitable for viewing on a connected display device 106. According to aspects of the present disclosure, the memory may further include instructions that when executed by the at least one processor, generally operate to perform processes associated with providing automated peripheral device setup and associated application traffic prioritization.

According to an example aspect, the digital receiver 102 may include an input/output mechanism operative or configured to receive input from the user via an input device, such as a remote control device 122, keyboard, or other computing device, such as a tablet/slate computer, smart phone, etc. The remote control device 122 or other device can communicate with the digital receiver 102 via a suitable communication transport, such as an infrared connection, radio waves, etc.

Figure 2:
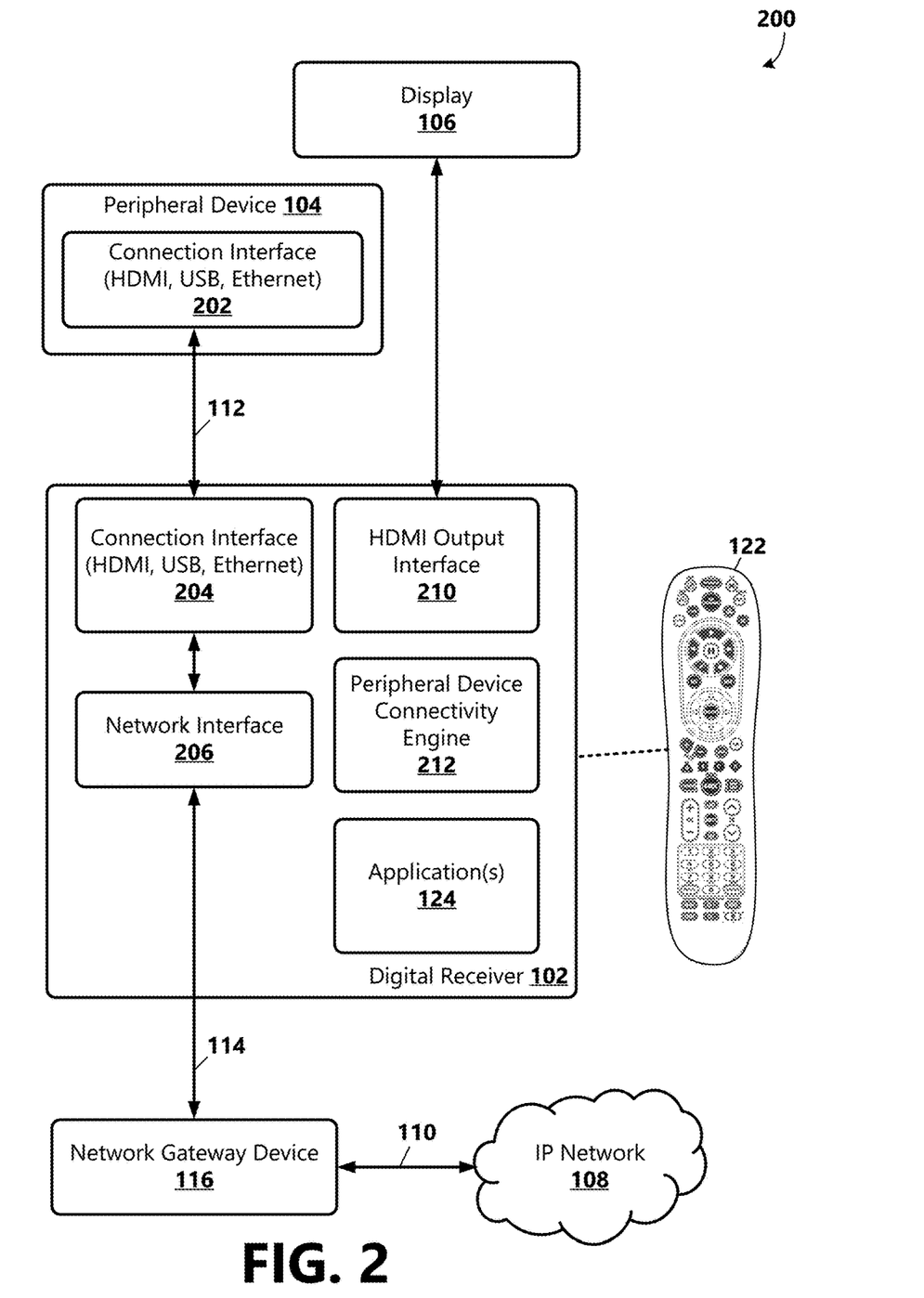
FIG. 2 is a block diagram of an example system for providing digital receiver integrated local channel insertion according to an embodiment.

In FIG. 2, the digital receiver 102 includes at least one connection interface (herein referred to as the digital receiver (DR) connection interface 204). The DR connection interface 204 may be functionally connected to a compatible connection interface included in the peripheral device 104. For example, the peripheral device 104 may include at least one connection interface (herein referred to as a peripheral device (PD) connection interface 202) that may be functionally connected to the DR connection interface 204 by a cable comprising connectors configured to be received by the PD connection interface 202 and the DR connection interface 204.

In one example implementation, the DR connection interface 204 includes an Ethernet port. The DR connection interface 204 may be operative or configured to leverage an Ethernet communications channel for digital communications of data (e.g., compressed or uncompressed video data, compressed or uncompressed digital audio data) between the peripheral device 104 and the digital receiver 102 in accordance with Ethernet protocols that define how the peripheral device 104 and the digital receiver 102 can communicate. In another example implementation, the DR connection interface 204 includes an HDMI port, wherein the DR connection interface 204 may be operative or configured to leverage an HDMI communications channel for digital communications of data between the peripheral device 104 and the digital receiver 102 per an HDMI specification. According to an aspect, the HDMI specification may provide support for IP networking via Ethernet data channels over the HDMI connection. For example, the HDMI 1.4 specification and later specifications provide support for IP networking via Ethernet data channels over the same HDMI cable that is used for video transmission, which may enable the peripheral device 104 and the digital receiver 102 to use Ethernet protocols to exchange information for establishing the first communications link 112. For example, Ethernet protocols may define the rules and encoding specifications for sending data, such as defining how computers identify one another on a network, the form that the data should take in transit, and how this information is processed once it reaches its final destination. Ethernet protocols may further define procedures for determining the type of error checking to be used, a data compression method, if needed, how the sending device will indicate that it has finished sending a message, how the receiving device will indicate that it has received a message, and the handling of lost or damaged transmissions or packets.

In another example implementation, the DR connection interface 204 includes a USB port, wherein the DR connection interface 204 may be operative or configured to leverage a USB communications channel for digital communications of data between the peripheral device 104 and the digital receiver 102 according to USB protocols. For example, USB protocols may define signaling and data transfer modes, data packet format, etc., that allow the digital receiver 102 to detect and configure the peripheral device 104 and carry out common functions, such as setting the peripheral device's network address, requesting a device descriptor, or checking the status of an endpoint for enabling an exchange of data via the first communications link 112. According to an aspect, connectivity to the PD connection interface 104 via an HDMI, Ethernet, or USB connection, enables the peripheral device 104 to announce itself and provide device information to the digital receiver 102 for establishing the first communications link 112.

In FIG. 2, the digital receiver 102 further includes a network interface via which the digital receiver 102 may connect to the gateway device 116 via the second communications link 114. For example, the network interface 206 may include a wired or wireless interface, such as an Ethernet interface, a WI-FI interface, or other communications interface. The digital receiver 102 may connect to the gateway device 116 for receiving IP network connectivity and for obtaining LAN traffic prioritization for an application 124 leveraging data provided by the connected peripheral device 104. According to an aspect, the application 124 may be an application operative or configured to support or leverage data of the data format transmitted by the peripheral device 104.

One example application 124 is a web videoconferencing application operative or configured to support or leverage video and audio data provided by a peripheral device 104 embodied as a web camera for a videoconferencing session. For example, a web videoconferencing application may be configured to provide one or a combination of Voice over Internet Protocol (VoIP) communications, video, instant messaging, file sharing, and screen sharing as part of providing an interactive online meeting environment. Moreover, the web videoconferencing application may provide a graphical user interface (GUI) for enabling the user to interact with various web videoconferencing application functions. The web videoconferencing application may include security features, and may provide encryption and decryption of communications. Additional features may be supported by the web videoconferencing application, such as various in-meeting controls, participant management controls, screen sharing, chatting, contacts integration, etc. In some examples, the application 124 may include or be in communication with a video compressor operating on the digital receiver 102, wherein the video compressor may be operative or configured to compress video data received from the peripheral device 104 into a format that is compliant with a suitable transmission protocol that can be communicated via the IP network 108 to another web videoconference session participant.

In some examples, the web videoconferencing application may be hosted by the subscriber's ISP, and may be configured to communicate with a web videoconferencing server (e.g., server 130) hosted by the ISP. For example, the ISP web videoconferencing server may be located on the ISP network, and may be operative to provide web videoconferencing services for establishing a videoconference session between clients. In other examples, the web videoconferencing application may be a third party application configured to communicate with a third party web videoconferencing server (e.g., server 130) located on an IP network 108. In some examples, the web videoconferencing server (e.g., server 130) may include or be in communication with a videoconferencing translation service. For example, the videoconferencing translation service may be a web-based service operative or configured to extend connectivity between clients using different web videoconferencing applications. For example, the videoconferencing translation service 126 may be configured to translate communications between different web videoconferencing services (e.g., a third party web videoconferencing service and an ISP web videoconferencing service). Other types of applications 124 may be configured to support or leverage data of the data format transmitted by the peripheral device 104, and are within the scope of aspects of the present disclosure. In some examples, the peripheral device 104 may be IP-enabled. When a peripheral device 104 is IP-enabled and may need a web connection to communicate over the IP network 108, the digital receiver 102 may be further configured to function as a bridge for extending IP network connectivity received via the network interface 206 to the peripheral device 104.

In FIG. 2, the digital receiver 102 further includes an HDMI output interface 210 operative or configured to provide an output channel to a display device 106, such as a television, monitor, etc. The HDMI output interface 210 may be communicatively connected to a compatible (i.e., HDMI) connectivity interface included in the display device 106 via an HDMI cable comprising connectors configured to be received by an HDMI port included in the HDMI output interface 210. For example, the digital receiver 102 may transmit uncompressed video data and compressed or uncompressed digital audio data to the display 106 via the HDMI cable.

According to an aspect, the digital receiver 102 further includes a peripheral device connectivity engine 212. The device connectivity engine 212 is illustrative of a software application, module, system, or device that is generally operative or configured to perform processes for providing automated peripheral device setup and associated application traffic prioritization. In some examples, in response to detecting that a peripheral device 104 is connected to the digital receiver 102 via the DR connection interface 204, the device connectivity engine 212 may be configured to obtain information about the peripheral device 104 and determine one or more applications 124 on the digital receiver 102 that support or are configured to leverage data of the data format transmitted by the peripheral device 104 based on the obtained peripheral device information.

In some examples, the one or more applications 124 may be disabled by default until a connection is made with a peripheral device 104 that can be leveraged by the one or more applications. For example, the digital receiver 102 may provide a graphical user interface (GUI) for display on the connected display device 106 via which various applications (e.g., web videoconferencing applications, video streaming applications, video guide application, audio streaming applications, gaming applications, messaging applications) on the digital receiver 102 may be shown (e.g., in a menu) and selectively opened by a user 101 (e.g., by selections made via a remote control 122 in communication with the digital receiver 102). According to a default setting, some applications, such as applications 124 that support or are configured to leverage data of the data format transmitted by the peripheral device 104, may be excluded from the menu until a determination is made that the peripheral device 104 is connectively attached via the DR connection interface 204. In some examples, a connective attachment may be made by plugging the peripheral device 104 into the digital receiver 102 and/or by powering on the peripheral device 104. In some examples, after detection of a connected peripheral device 104 and a determination of one or more applications 124 on the digital receiver 102 that support data of the data format transmitted by the connected peripheral device 104, the device connectivity engine 212 may be further configured to enable the one or more applications 124 to be displayed in the GUI menu and to be selectively opened by the user 101.

In some examples, in response to receiving an indication of a selection of an application 124, the device connectivity engine 212 may be further configured to communicate with the network gateway device 116 for instructing the network gateway device 116 to provide a prioritized communications channel on the LAN 120 for traffic originating from the application 124 and traffic destined for the application 124. For example, the device connectivity engine 212 may communicate with the network gateway device 116 to establish an upstream and downstream communication channel with quality of service (QoS) settings that ensure that traffic associated with the selected application 124 are prioritized for providing a good user experience (e.g., audio and video data may be created and transmitted in real-time where slower transmission speeds or queuing may cause data packets to be delayed and dropped, resulting in poor video/audio quality (e.g., video and/or audio dropouts)). In some examples, QoS settings (e.g., bandwidth settings, classification/prioritization) may be adjusted to prioritize the selected application's traffic on the LAN 120 by dynamically creating QoS rules or activating preset QoS rules that may define QoS markings for bandwidth allocation, preferential traffic treatment, etc., based on the selected application 124 and the data format supported by the connected peripheral device 104. The prioritized communications channel may minimize the impact of limited bandwidth on the LAN 120.

In some examples, digital receiver integrated local channel insertion provided by aspects of the present disclosure may be tied to a subscription for local channel insertion services. For example, an ISP billing system may be interrogated to determine whether a subscriber is provisioned for local channel insertion; wherein when the subscriber is authorized for local channel insertion services, the device connectivity engine 212 may be enabled to perform various operations for providing automated peripheral device setup and management and traffic prioritization for an application leveraging the peripheral device.

Aspects of the present disclosure can reduce cost, complexity, and barriers to entry to videoconferencing in a typical consumer home, but is not so limited. For example, aspects of the present disclosure may provide a user experience where a user 101 can easily connect a peripheral device 104 to the connection interface 204 included in the digital receiver 102 and then selectively launch an application 124, wherein setup and configuration of the peripheral device 104 may be automatically performed and a communications channel with prioritized QoS settings may be automatically established. As an example, a web camera may be plugged into the digital receiver 102 via an HDMI, Ethernet, or USB connection, and the digital receiver 102 may automatically set up and configure the web camera for communicating with the digital receiver 102. Accordingly, a user-selection of an application 124 that supports data of the data format transmitted by the peripheral device 104, such as a web videoconferencing application, may enable the user 101 to engage in a videoconferencing session with one or more other participants in a relaxed environment using a primary television screen (display device 106), without requiring user-involved set-up or specialty web conferencing devices. Further, rather than being confined to an awkward or restrictive environment that can limit the flexibility and comfort of use during a web videoconference, aspects of the present disclosure are implemented using a digital receiver 102 that may already provisioned to the user/subscriber and that may likely be connected to a larger display device 106 in the home and located in a comfortable setting in the home (e.g., in a living/family room). Accordingly, as more people across all demographics trend to staying home, especially during pandemic or other types of emergency situations, aspects of digital receiver integrated web videoconferencing provide an immediate avenue to enable users to maintain some semblance of social norms with their friend and families in a comfortable setting in their homes.

Figure 3:
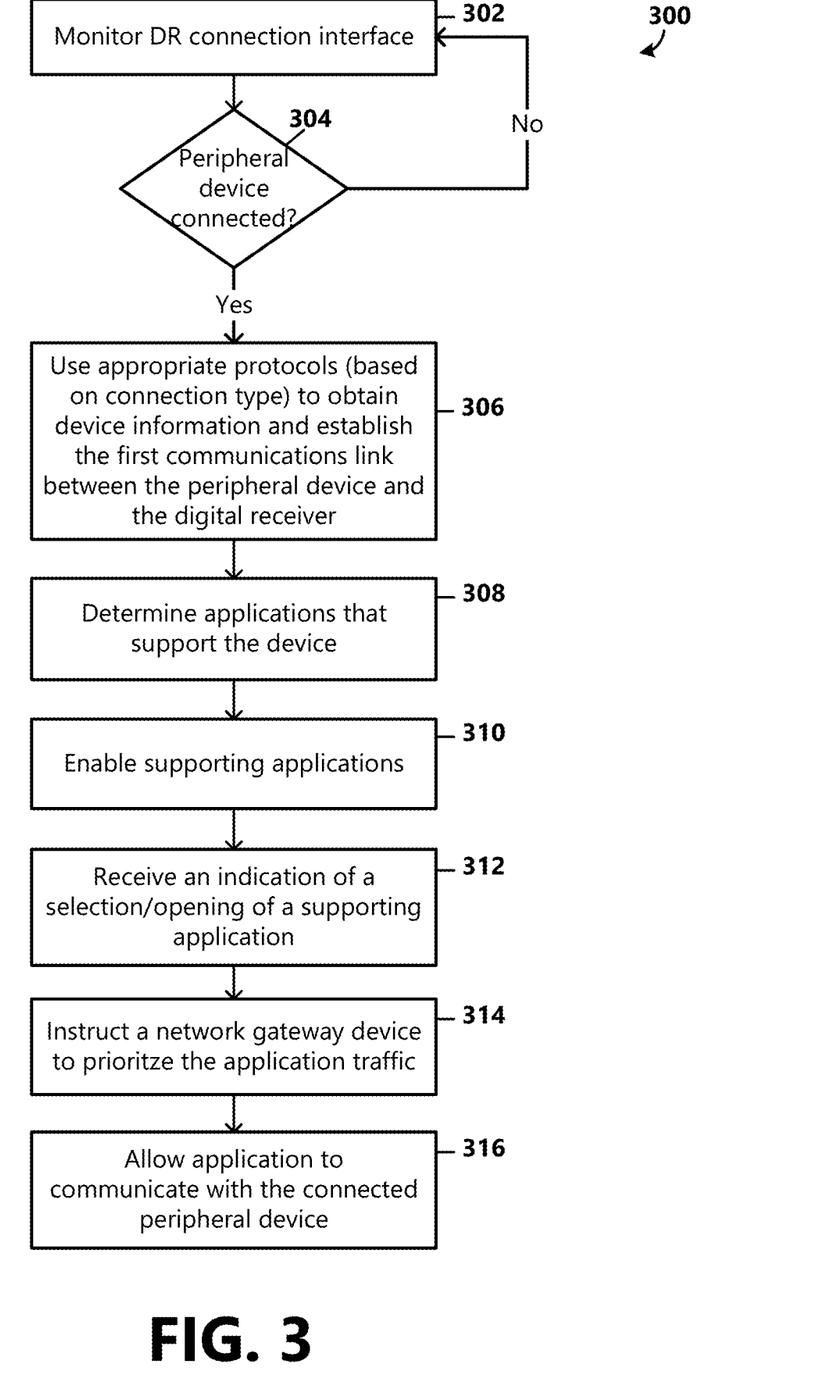
FIG. 3 is a flow chart depicting general stages of an example process for providing digital receiver integrated local channel insertion according to an embodiment.

FIG. 3 is a flow chart depicting general stages of an example process or method 300 for providing digital receiver integrated local channel insertion according to an embodiment. At OPERATION 302, the DR connection interface 204 may be monitored for a physical connection (e.g., HDMI connection, Ethernet connection, or USB connection). When a connection is detected at DECISION OPERATION 304, for example, when one end of a cable is plugged into the PD connection interface 202 of the peripheral device 104 and the other end of the cable is plugged into the DR connection interface 204 of the digital receiver 102, the method 300 may proceed to OPERATION 306, where appropriate protocols, based on the connection type, are used to obtain device information for establishing the first communications link 112 between the peripheral device 104 and the digital receiver 102. For example, communications may be exchanged between the peripheral device 104 and the digital receiver 102 based on the connection type to enable the digital receiver 102 to obtain device information, configure the peripheral device 104, and/or perform control operations that may be unique to the peripheral device 104.

In some examples, such as when the peripheral device 104 is connected to the digital receiver 102 through a USB port, a control transfer may be initiated by the digital receiver 102 to obtain device configuration information. The peripheral device 104 may provide responses that include device configuration information based on a standard set of descriptors. Example configuration information include: device descriptors, which may include general information about the peripheral device 104 (e.g., vendor, manufacturer, product, and version/revision ID, serial number, supported device class, subclass and protocol, if applicable, maximum packet size); configuration descriptors, which may include information associated with supported configurations, the number of interfaces in a supported configuration, suspend and resume functionalities supported, and power requirements; interface descriptors, which may include an endpoint address, traffic direction and type, maximum packet size supported, and if type is an interrupt endpoint, polling frequency; and string descriptors. In some examples, the digital receiver 102 may use received device information to determine and access an appropriate device driver to enable the digital receiver 102 to communicate with the peripheral device 104 via a communications pipe (e.g., a data stream pipe for enabling the peripheral device 104 to transfer video and audio data streams to the digital receiver 102). If the appropriate device driver is not stored on the digital receiver 102, the digital receiver 102 may use received device information (e.g., peripheral device manufacturer, model, version ID) and/or user input to obtain the appropriate device driver (e.g., download and install the appropriate device driver from a database, network 108 location, computer-readable storage media, or other storage location).

In other examples, such as when the peripheral device 104 is connected to the digital receiver 102 by an Ethernet or HDMI cable plugged into an Ethernet or HDMI port included in the digital receiver 102, network connectivity may be extended to the peripheral device 104, and IP protocols and standard media access and signaling technologies may be used to establish an Ethernet communications channel (i.e., the first communications link 112) between the peripheral device 104 and the digital receiver 102. For example, high-speed, bi-directional communications may be enabled via a data channel included in an Ethernet or HDMI connection, which allows the digital receiver 102 to share its network connection without a separate Ethernet cable/network connection. In some examples, a discovery process may be performed where the peripheral device 104 and the digital receiver 102 recognize each other and determine they are both authorized to transport a high bandwidth Ethernet or Ethernet over HDMI signal. For example, the peripheral device 104 may have an IP address manually or automatically assigned to it as part of connecting to a network (e.g., the LAN 120), where the IP address may serve as a network interface ID and a node/host location address. The peripheral device 104 and the digital receiver 102 may obtain and cache IP address/MAC address pairs for addressing message packets exchanged between the peripheral device 104 and the digital receiver 102 on the first communications link 112, wherein IP protocols may govern the rules for addressing network messages and exchanging message packets, which may include placing messages including video and audio data into frames that include both destination and return addresses. In some examples, as part of establishing the connection between the peripheral device 104 and the digital receiver 102, information about the peripheral device 104 may be provided to the digital receiver 102, which may include information such as device manufacturer, model number, serial number, settings capabilities (e.g. supported video resolutions, audio modes), etc.

At OPERATION 308, a determination may be made as to which applications 124 on the digital receiver 102 may be configured to leverage or support the peripheral device 104/data of the data format provided by the peripheral device 104. In some examples, peripheral device 104 information received at OPERATION 306 may be used to determine the one or more applications 124. In one implementation example, the peripheral device connectivity engine 212 may be used to identify one or more applications 124 that may support video and audio data, such as a videoconferencing application. In other implementation examples, other types of applications 124 that may support video and audio data or other types of data may be identified.

At OPERATION 310, the one or more applications 124 determined to support the peripheral device 104 may be enabled. For example, a default setting may cause the one or more applications 124 to be disabled until a connection is made with a peripheral device 104 that provides data of a data format that can be used by the one or more applications 124. Accordingly, based on the type of peripheral device 104 that is connected to the digital receiver 102, one or more applications 124 that may leverage data provided by the peripheral device 104 may be enabled to be selectively opened by a user 101. In some examples, the one or more applications 124 may be included in a digital receiver GUI displayed on a connected display device 106. For example, a menu including various applications 124 included in the digital receiver 102, including the one or more applications 124 determined to support the peripheral device 104, may be displayed in the GUI and selectively opened by a user.

Figure 4:
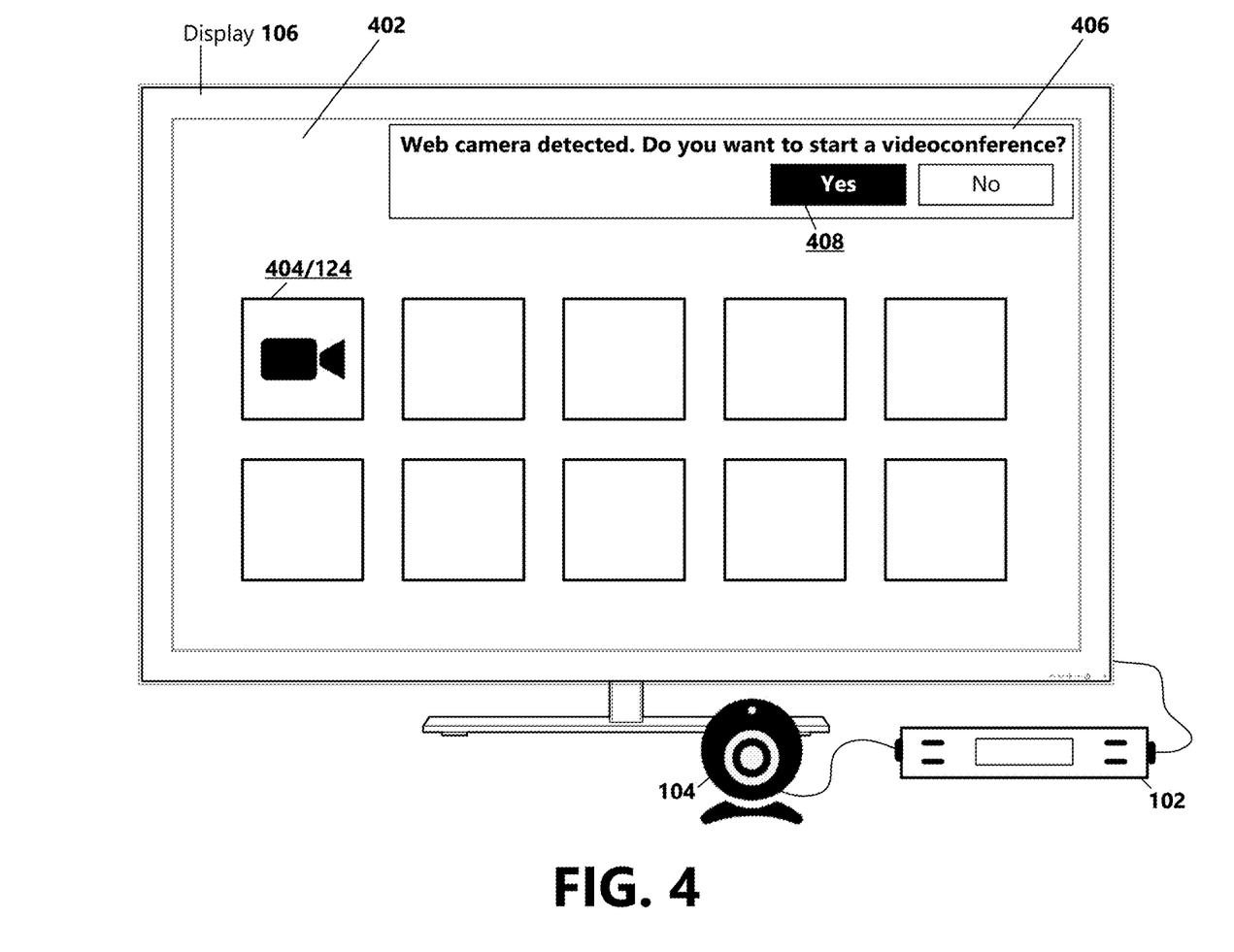
FIG. 4 is an illustration of an example graphical user interface that may be provided by aspects of the present disclosure according to an embodiment.

FIG. 4 includes an illustration of an example digital receiver GUI 402 that may be displayed on a connected display device 106 that may include a menu of applications 124 available on the digital receiver 102. For example, the GUI 402 may include one or more selectable controls 404 associated with the one or more applications 124 determined to support the peripheral device 104, which when selected, may cause the associated application 124 to open. In some examples and as illustrated in FIG. 4, a message 406 may be provided by the digital receiver 102 and displayed on the display device 106 that may inform the user 101 about the connected peripheral device 104. The message 406 may further prompt/ask the user 101 to open an application 124 determined to support the connected peripheral device 104, if desired. For example, a selectable control 408 may be included in the message 406, which when selected, may cause an associated application 124 to open. In some examples, the one or more applications 124 determined to support the peripheral device 104 may be marked or flagged. For example, a flag may be associated with the one or more applications 124, wherein a detected action associated with a flagged application (e.g., opening a flagged application, closing a flagged application) may be associated with an action to be performed by the peripheral device connectivity engine 212.

With reference again to FIG. 3, at OPERATION 312, an indication of a selection of one of the one or more applications 124 determined to support the peripheral device 104 may be received. For example, the user 101 may use the remote control 122 or another input method to select a desired application 124 displayed in the digital receiver GUI 402 displayed on the connected display device 106. In response, the selected application 124 may be opened. In an example implementation, the selected application 124 is a videoconferencing application configured to use video and audio data provided by the peripheral device 104. The GUI 402 displayed on the display device 106 may be updated to display a GUI associated with the selected application 124.

At OPERATION 314, the peripheral device connectivity engine 212 may be configured to act on a detected activity associated with the selected application 124. For example, a flag may be associated with the selected application 124; and in response to opening the application 124, the peripheral device connectivity engine 212 may be configured to communicate with the network gateway device 106 to establish an upstream and downstream communications channel (i.e., second communications link 114) between the application 124 with quality of service (QoS) settings that ensure that communications destined to and sent from the application 124 are prioritized for providing a good user experience (e.g., according to a service level guaranteed for the type of application/application traffic). For example, in cases where the application 124 is a videoconferencing application, audio and video data provided by the web camera may be created and transmitted in real-time, where slower transmission speeds or queuing may cause data packets to be delayed and dropped, resulting in poor video/audio quality (e.g., video and/or audio dropouts). Accordingly, QoS settings (e.g., bandwidth settings, classification/prioritization) may be adjusted to prioritize the application's network traffic. In some examples, one or more QoS rules may be dynamically created or configured on the network gateway device 106 that prioritize the application's traffic. In other examples, one or more preconfigured QoS rules may be activated that may prioritize the application's traffic. Prioritizing the application's traffic may include QoS markings by the network gateway device for bandwidth allocation, preferential traffic treatment, etc. In some examples, the QoS markings may be based on the type of data communicated by the application 124.

At OPERATION 316, the application 124 may be allowed to communicate with the connected peripheral device 104. For example, communications received from the peripheral device 104 via the DR connection interface 204 may be directed to the application 124, and the application 124 may be further enabled to transmit data to the peripheral device 104 via the DR connection interface 204. In cases where the application 124 is a videoconferencing application, the application 124 may be operative to receive user inputs via a videoconferencing application GUI displayed on the connected display device 106 and to establish a videoconferencing session with one or more videoconference endpoints based on the user inputs. In some examples, the videoconferencing application 124 may communicate with a network service provider videoconferencing server or a third party videoconferencing server as part of establishing the videoconference session with one or more videoconference participants. In some examples, the application 124 may be further operative or configured to receive audio and video data from the peripheral device 104, process the received data for display/play on the connected display device 106 and for transmitting the received data over the IP network 108 to the one or more videoconference participants. For example, input received from the connected peripheral device 104 may be directed to the HDMI output interface 210 of the digital receiver 102 with associated graphical overlay and control elements provided by the videoconferencing application 124. The user 101 may be enabled to use various control elements included in the videoconferencing application 124 GUI to interact with the videoconference session. In some examples, processing the received data includes compressing the data for transmission to one or more IP network endpoints. For example, the data may be transmitted to the network gateway device 116 via a prioritized communications channel (i.e., second communications link 114), where the data may then be directed to endpoints via the IP network 108.

The application 124 may be further operative or configured to receive audio and video data originating from the one or more videoconference participants. For example, communications originating from another videoconference client may be addressed to the application 124. When the communication are received by the network gateway device 116, the communications may be directed to the digital receiver 102 and prioritized on the LAN 120 based on the previously-configured QoS settings, and then received by the digital receiver 102 and further by the application 124. For example, prioritization of the application's traffic may minimize effects of limited bandwidth on application performance. The application 124 may be further configured to decompress the received communications and further process the received communications for display on the connected display device 106. Accordingly, the user 101 may be enabled to have a two-way videoconferencing call with one or more participants using a connected web camera and microphone (i.e., peripheral device 104) and the user's main television screen (i.e., display device 106) as the webcam/videoconferencing screen communicating on a prioritized local channel, without requiring manual setup or device management of a peripheral device and/or videoconferencing session.

Figure 5:
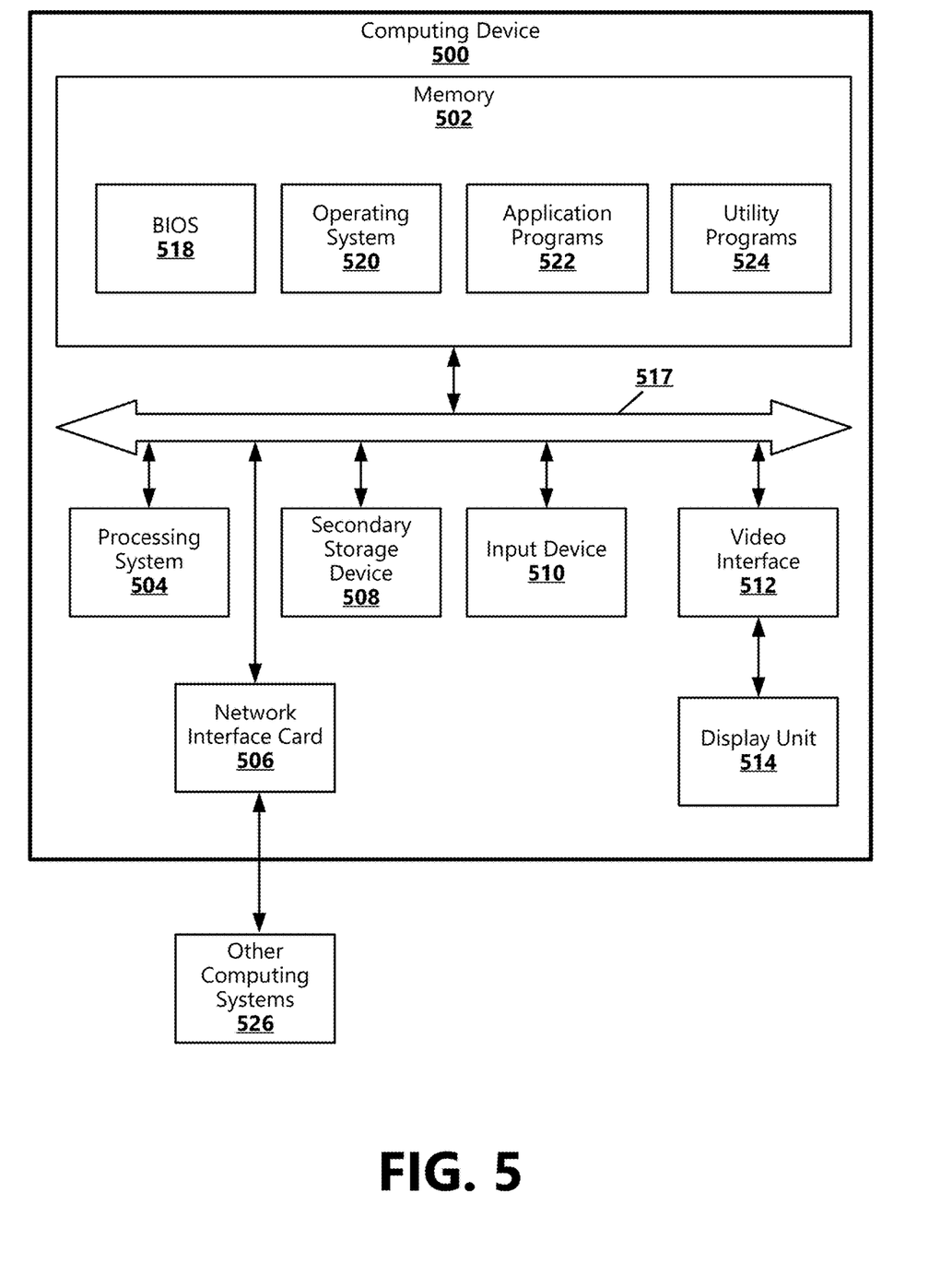
FIG. 5 is a block diagram illustrating example physical components of a computing device or system with which embodiments may be practiced.

FIG. 5 is a block diagram illustrating example physical components of a computing device 500 or system with which embodiments may be practiced. It should be appreciated that in other embodiments, different hardware components other than those illustrated in the example of FIG. 5 may be used. Computing devices may be implemented in different ways in different embodiments. For instance, in the example of FIG. 5, the computing device 500 includes a processing system 504, memory 502, a network interface card 506 (wired and/or wireless), a secondary storage device 508, an input device 510, a video interface 512, a display unit 514, and a communication medium 517. In other embodiments, the computing device 500 may be implemented using more or fewer hardware components (e.g., a video interface, a display unit, or an input device) or in combination with other types of computer systems 526 and program modules.

The memory 502 includes one or more computer-readable storage media capable of storing data and/or computer-executable instructions. Memory 502 may store the computer-executable instructions that, when executed by a processor or processing unit of the processing system 504, cause operations, such as the operations described above with respect to FIG. 3) to provide digital receiver integrated local channel insertion. In various embodiments, the memory 502 is implemented in various ways. For example, the memory 502 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and non-volatile, removable and non-removable media implemented in various methods or technologies for storage and retrieval of information. Such information can include data structures, program modules, computer-executable instructions, or other data.

The processing system 504 includes one or more processing units (e.g., one or more processors), which may include tangible integrated circuits that selectively execute computer-executable instructions. In various embodiments, the processing units in the processing system 504 are implemented in various ways. For example, the processing units in the processing system 504 can be implemented as one or more processing cores. In this example, the processing system 504 can comprise one or more microprocessors. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to and receive data from a communication network via a network interface card 506. In different embodiments, the network interface card 506 is implemented in different ways, such as an Ethernet interface, a token-ring network interface, a fiber optic network interface, a wireless network interface (e.g., W-Fi®, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 508 includes one or more computer-readable storage media, and may store data and computer-executable instructions not directly accessible by the processing system 504. That is, the processing system 504 performs an I/O operation to retrieve data and/or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, key pads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 517 facilitates communication among the hardware components of the computing device 500. In different embodiments, the communications medium 517 facilitates communication among different components of the computing device 500. For instance, in the example of FIG. 5, the communications medium 517 facilitates communication among the memory 502, the processing system 504, the network interface card 506, the secondary storage device 508, the input device 510, and the video interface 512. In different embodiments, the communications medium 517 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. For instance, in the example of FIG. 5, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs or program code 522 that, when executed by the processing system 504, cause the computing device 500 to provide applications to users. The memory 502 also stores one or more utility programs 524 that, when executed by the processing system 504, cause the computing device 500 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPoE), etc. including any combination thereof.

Figure 6:
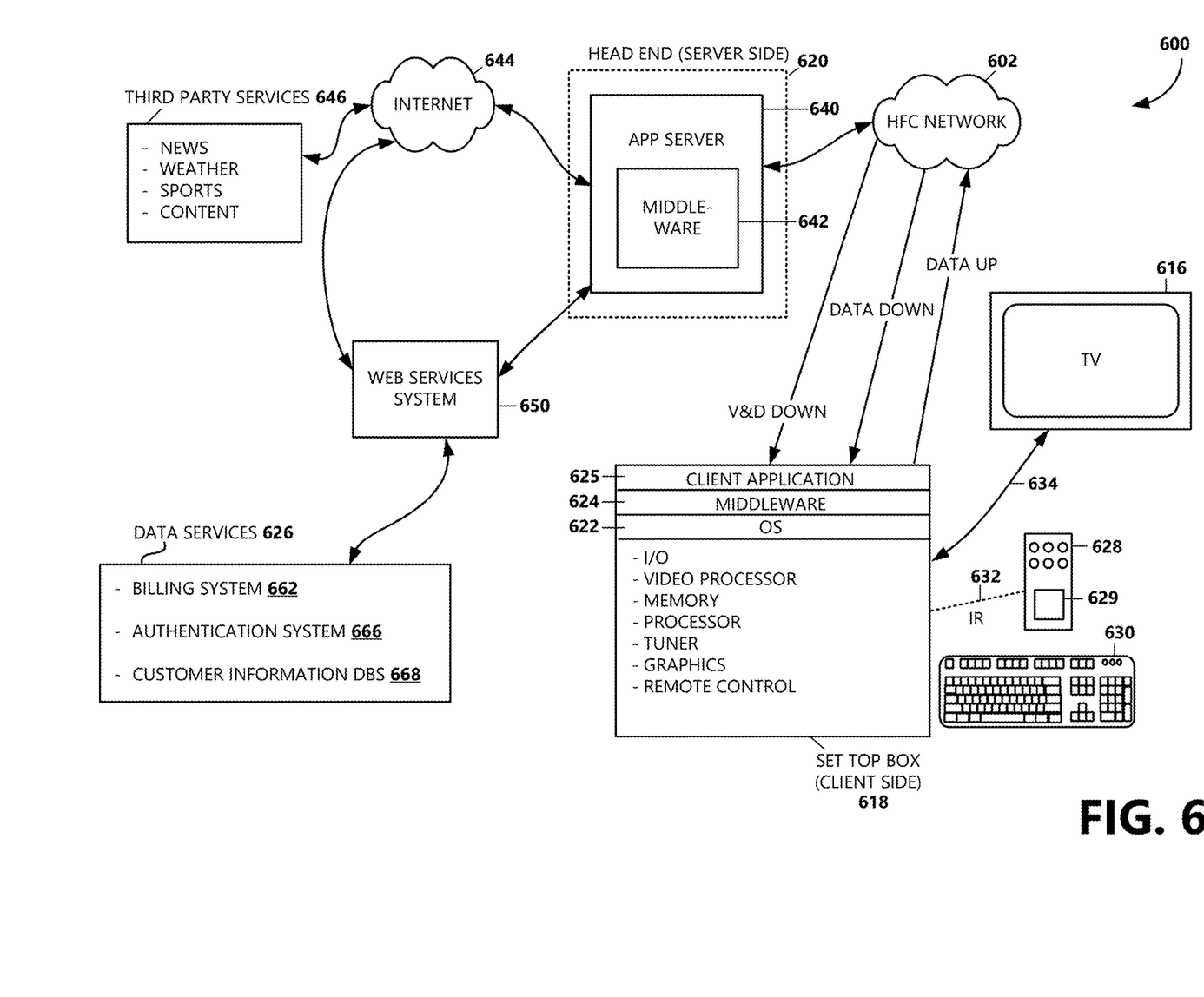
FIG. 6 is a block diagram illustrating components of a cable services system architecture providing an example operating environment according to aspects of the present disclosure.

FIG. 6 is a block diagram illustrating a cable television services system 600 (hereafter referred to as "CATV") architecture providing an operating environment according to an aspect. As should be appreciated, a CATV services system 600 is but one of various types of systems that can be utilized for providing an operating environment in which digital receiver integrated local channel insertion may be provided using one or more aspects described herein. Referring now to FIG. 6, digital and analog video programming, information content and interactive television services are provided via a HFC network 602 to a television set 616 for consumption by a cable television/services system customer. As is known to those skilled in the art, HFC networks 602 combine both fiber optic cable lines and coaxial cable lines. Typically, fiber optic cable lines run from the cable headend 620 to neighborhoods of subscribers. Coaxial cable lines run from the optical fiber feeders to each customer or subscriber.

The CATV system 600 is in the form of a distributed client-server computing system for providing video and data flow across the HFC network 602 between server-side services providers (e.g., cable television/services providers) via a server-side headend 620 and a client-side customer via a set-top box (STB) 618 functionally connected to a customer receiving device, such as the television set 616. The functionality of the HFC network 602 allows for efficient bidirectional data flow between the set-top box 618 and an application server 640 of the server-side headend 620. As is understood by those skilled in the art, modern CATV systems 600 can provide a variety of services across the HFC network 602 including traditional digital and analog video programming, telephone services, high speed Internet access, video-on-demand, and services.

On the client side of the CATV system 600, digital and analog video programming and digital and analog data are provided to the customer television set 616 via the STB 618. In some examples, the digital receiver 102 may be embodied as the STB 618. Interactive television services that allow a customer to input data to the CATV system 600 likewise are provided by the STB 618. As illustrated in FIG. 6, the STB 618 is a multipurpose computing device having a computer processor, memory, and an input/output mechanism. The input/output mechanism receives input from server-side processes via the HFC network 602 and from customers via input devices such as a remote control device 628, keyboard 630, or other computing device, such as a tablet/slate computer, smart phone, etc. The remote control device 628 and the keyboard 630 can communicate with the STB 618 via a suitable communication transport such as the infrared connection 632. The STB 618 also includes a video processor for processing and providing digital and analog video signaling to the television set 616 via a cable communication transport 634. A multi-channel tuner is provided for processing video and data to and from the STB 618 and the server-side headend 620, described below.

The STB 618 also includes an operating system 622 for directing the functions of the STB 618 in conjunction with a variety of client applications 625. For example, if a client application 625 requires a news flash from a third party news source to be displayed on the television 616, the operating system 622 can cause the graphics functionality and video processor of the STB 618, for example, to output the news flash to the television 616 at the direction of the client application 625 responsible for displaying news items.

Because a variety of different operating systems 622 can be utilized by a variety of different brands and types of set-top boxes 618, a middleware layer 624 can be provided to allow a given software application to be executed by a variety of different operating systems. According to an embodiment, the middleware layer 624 can include a set of application programming interfaces (APIs) that are exposed to client applications and operating systems 622 that allow client applications 625 to communicate with the operating systems 622 through common data calls understood via the API set. As described below, a corresponding middleware layer 642 is included on the server side of the CATV system 600 for facilitating communication between the server-side application server and the client-side STB 618. The middleware layer 642 of the server-side application server and the middleware layer 624 of the client-side STB 618 can format data passed between the client side and server side according to the Extensible Markup Language (XML).

According to one aspect, the STB 618 passes digital and analog video and data signaling to the television 616 via a one-way communication transport 634. According to other aspects, two-way communication transports can be utilized, for example, via high definition multimedia (HDMI) ports. The STB 618 can receive video and data from the server side of the CATV system 600 via the HFC network 602 through a video/data downlink and data via a data downlink. The STB 618 can transmit data from the client side of the CATV system 600 to the server side of the CATV system 600 via the HFC network 602 via one data uplink. The video/data downlink is an "in band" downlink that allows for digital and analog video and data signaling from the server side of the CATV system 600 through the HFC network 602 to the STB 618 for use by the STB 618 and for distribution to the television set 616. As is understood by those skilled in the art, the downstream signaling space operates at a relative high frequency, e.g., between 54 and 1800 megahertz. The downstream signaling space is generally divided into 6 megahertz channels in which can be transmitted as a single analog signal or a greater number (e.g., ten) of digital signals.

The data downlink and the data uplink, illustrated in FIG. 6, between the HFC network 602 and the set-top box 618 comprise upstream data links. As is understand by those skilled in the art, the upstream frequency range is generally at a lower frequency than downstream signaling. For example, the upstream frequency range can be between 5 and 45 megahertz. Data flow between the STB 618 and the server-side application server 640 is typically passed through the upstream data links. Alternatively, an downstream data carousel can be positioned in an downstream channel into which a data feed can be processed from the application server 640 through the HFC network 602 to the STB 618. Operation of data transport between components of the CATV system 600, described with reference to FIG. 6, is well known to those skilled in the art.

Referring still to FIG. 6, the headend 620 of the CATV system 600 is positioned on the server side of the CATV system and includes hardware and software systems responsible for originating and managing content for distributing through the HFC network 602 to client-side STBs 618 for presentation to customers. As described above, a number of services can be provided by the CATV system 600, including digital and analog video programming, interactive television services, telephone services, video-on-demand services, targeted advertising, and/or provision of supplemental content.

The application server 640 can be configured as a computing system operative to assemble and manage data sent to and received from the STB 618 via the HFC network 602. As described above, the application server 640 includes a middleware layer 642 for processing and preparing data from the headend 620 of the CATV system 600 for receipt and use by the client-side STB 618. For example, the application server 640 via the middleware layer 642 can obtain supplemental content from third party services 646 via the Internet 644 for transmitting to a customer through the HFC network 602, the STB 618, and recording by a local or remote DVR. For example, content metadata from a third party content provider service can be downloaded by the application server 640 via the Internet 644. When the application server 640 receives the downloaded content metadata, the middleware layer 642 can be utilized to format the content metadata for receipt and use by the STB 618. Therefore, content metadata can be sent and categorized based on the availability to the customer's program guide data.

According to one embodiment, data obtained and managed by the middleware layer 642 of the application server 640 is formatted according to the Extensible Markup Language (XML) and is passed to the STB 618 through the HFC network 602 where the XML-formatted data can be utilized by a client application 625 in concert with the middleware layer 624, as described above. As should be appreciated by those skilled in the art, a variety of third party services data 646, including news data, weather data, sports data and other information content can be obtained by the application server 640 via distributed computing environments such as the Internet 644 for provision to customers via the HFC network 602 and the STB 618. Additionally, the application server 640 may receive data via the Internet 644.

According to aspects, the application server 640 obtains customer support services data, including billing data, information on customer work order status, answers to frequently asked questions, services provider contact information, and the like from data services 626 for provision to the customer via an interactive television session. The data services 626 include a number of services operated by the services provider of the CATV system 600 which can include profile and other data associated with a given customer.

A billing system 662 can include information such as a customer's name, street address, business identification number, Social Security number, credit history, and information regarding services and products subscribed to by the customer. According to embodiments, the billing system 662 can also include billing data for services and products subscribed to by the customer for bill processing, billing presentment and payment receipt. An authentication system 666 can include information such as secure user names, subscriber profiles, subscriber IDs, and passwords utilized by customers for access to network services. A customer information database 668 can include general information about customers such as place of employment, business address, business telephone number, and demographic information such as age, gender, educational level, and the like. The customer information database 668 can also include information on pending work orders for services or products ordered by the customer. The customer information database 668 can also include general customer information such as answers to frequently asked customer questions and contact information for various service provider offices/departments. As should be understood, this information can be stored in a variety of disparate databases operated by the cable services provider.

Referring still to FIG. 6, web services system 650 is illustrated between the application server 640 and the data services 626. According to aspects, web services system 650 serves as a collection point for data requested from each of the disparate data services systems comprising the data services 626. According to aspects, when the application server 640 requires customer services data from one or more of the data services 626, the application server 640 passes a data query to the web services system 650. The web services system 650 formulates a data query to each of the available data services systems for obtaining any required data for a requesting customer as identified by a set-top box identification associated with the customer. The web services system 650 serves as an abstraction layer between the various data services systems and the application server 640. That is, the application server 640 is not required to communicate with the disparate data services systems, nor is the application server 640 required to understand the data structures or data types utilized by the disparate data services systems. The web services system 650 is operative to communicate with each of the disparate data services systems for obtaining necessary customer data. The customer data obtained by the web services system is assembled and is returned to the application server 640 for ultimate processing via the middleware layer 642, as described above. As should be understood by those skilled in the art, the disparate systems 650, 662, 666, 668 can be integrated or provided in any combination of separate systems, wherein FIG. 6 shows only one example.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

What is claimed is:

1. A system for providing digital receiver integrated local channel insertion, comprising:
   at least one processor;
   a memory coupled to the at least one processor, the memory including instructions that when executed by the at least one processor operate to:
      monitor a connection interface of a digital receiver for a connected peripheral device comprising a web camera, wherein a first high definition connection couples the web camera with the digital receiver and a second high definition connection couples the digital receiver with a high definition display configured to display video captured by the web camera; and
      in response to receiving an indication of a connected peripheral device comprising the web camera:
         perform a discovery process to obtain peripheral device information including a data type supported by the peripheral device;
         establish a communications link between the digital receiver and the peripheral device;
         determine one or more selectable applications configured to leverage data of the data type supported by the peripheral device; and
            in response to receiving an indication of a selection to utilize one of the one or more applications:
               allow a selected application to communicate with the peripheral device; and
               instruct, in response to a request from the digital receiver to a network gateway device on a local communications network for priority of application traffic of the selected application, the network gateway device to prioritize traffic of the selected application on the local communications network provided by the network gateway device.

2. The system of claim 1, wherein the connection interface includes one of:
   a Universal Serial Bus (USB) port configured to receive a USB cable connection;
   an HDMI (High-Definition Multimedia Interface) port configured to receive an HDMI cable connection; or
   an Ethernet port configured to receive an Ethernet cable connection.

3. The system of claim 2, wherein when the connection interface is an HDMI or Ethernet port, the system is configured to use Ethernet and Internet Protocols to obtain peripheral device information and to establish an HDMI or Ethernet communications link, respectively, with the peripheral device.

4. The system of claim 3, wherein the peripheral device comprises an HDMI or Ethernet port configured to receive an HDMI or Ethernet cable connection, respectively.

5. The system of claim 2, wherein when the connection interface is a USB port, the system is configured to use USB protocols to obtain device information and to establish a USB communications link with the peripheral device.

6. The system of claim 5, wherein the peripheral device comprises a USB port configured to receive a USB cable connection.

7. The system of claim 2, wherein the selected application is a web videoconferencing application configured to support audio and video data provided by the peripheral device.

8. The system of claim 1, wherein the system is further configured to instruct the network gateway device to adjust one or more Quality of Service (QoS) settings for the directed to and originating from the selected application over the local communications network.

9. A method for providing digital receiver integrated local channel insertion, comprising:
   monitoring a connection interface of a digital receiver for a connected peripheral device comprising a web camera, wherein a first high definition connection couples the web camera with the digital receiver and a second high definition connection couples the digital receiver with a high definition display configured to display video captured by the web camera; and
   in response to receiving an indication of a connected peripheral device comprising the web camera:
      performing a discovery process to obtain peripheral device information including a data type supported by the peripheral device;
      establishing a communications link between the digital receiver and the peripheral device;
      determining one or more selectable applications configured to leverage data of the data type supported by the peripheral device; and
         in response to receiving an indication of a selection to open one of the one or more applications:
            allowing a selected application to communicate with the peripheral device; and
            instructing, in response to a request from the digital receiver to a network gateway device on a local communications network for priority of application traffic of the selected application, the network gateway device to prioritize traffic of the selected application on the local communications network provided by the network gateway device.

10. The method of claim 9, wherein monitoring the connection interface comprises monitoring one of:
   a Universal Serial Bus (USB) port configured to receive a USB cable connection;

an HDMI (High-Definition Multimedia Interface) port configured to receive an HDMI cable connection; or an Ethernet port configured to receive an Ethernet cable connection.

11. The method of claim 10, wherein performing the discovery process comprises using an appropriate communications protocol to obtain the peripheral device information based on the connection interface type.

12. The method of claim 11, wherein:

when the connection interface is an HDMI or Ethernet port, using Ethernet and Internet Protocols to obtain the peripheral device information and to establish an HDMI or Ethernet communications link, respectively, with the peripheral device; and when the connection interface is a USB port, using USB protocols to obtain device information and to establish a USB communications link with the peripheral device, the peripheral device comprising a corresponding USB connection interface.

13. The method of claim 9, wherein determining one or more applications configured to leverage data of the data type provided by the peripheral device comprises determining at least one web videoconferencing application configured to support audio and video data provided by the peripheral device.

14. The method of claim 9, wherein instructing the network gateway device to prioritize the selected application's traffic comprises instructing the network gateway device to adjust one or more Quality of Service (QoS) settings for the directed to and originating from the selected application over the local communications network.

15. A digital receiver, the digital receiver comprising:

a connection interface for connecting to a peripheral device comprising a web camera and a high definition display configured to display video captured by the web camera, wherein a first high definition connection couples the web camera with the digital receiver and a second high definition connection couples the digital receiver with the high definition display;

a network interface via which the digital receiver is communicatively connected to a network gateway device, the network gateway device providing a local communications network connected to an Internet Protocol network;

at least one processor;

a memory coupled to the at least one processor, the memory including instructions that when executed by the at least one processor operate to:

monitor the connection interface of the digital receiver for a connected peripheral device comprising the web camera; and in response to receiving an indication of a connected peripheral device comprising the web camera:

perform a discovery process to obtain peripheral device information;

establish a communications link between the digital receiver and the peripheral device based on the peripheral device information received as part of the discovery process;

determine one or more selectable applications configured to leverage data of a data type provided by the peripheral device; and in response to receiving an indication of a selection to open one of the one or more applications:

allow a selected application to communicate with the peripheral device for receiving data provided by the peripheral device; and request priority from the network gateway device for application traffic of the selected application on the local communications network provided by the network gateway device.

16. The digital receiver of claim 15, further comprising an HDMI output interface configured to receive an HDMI cable connection connected to a display device comprising the high definition display.

17. The digital receiver of claim 15, further operative to direct data received from the peripheral device to the display device for display with associated graphical overlay and control elements provided by the selected application.

18. The digital receiver of claim 15, wherein:

when the connection interface is configured to receive an HDMI or Ethernet connection, the digital receiver is operative to use Ethernet and Internet Protocols to obtain peripheral device information and to establish an HDMI or Ethernet communications link, respectively, with the peripheral device, the peripheral device comprising a corresponding HDMI or Ethernet connection interface; and when the connection interface is configured to receive a USB connection, the digital receiver is operative to use USB protocols to obtain device information and to establish a USB communications link with the peripheral device, the peripheral device comprising a corresponding USB connection interface.

19. The digital receiver of claim 15, wherein the selected application is a web videoconferencing application configured to support audio and video data provided by the peripheral device.

20. The digital receiver of claim 15, further configured to instruct the network gateway device to adjust one or more Quality of Service (QoS) settings for the directed to and originating from the selected application over the local communications network.

* * * * *